Nov. 19, 1957

H. BOUWMAN ET AL 2,814,020

ARRANGEMENT FOR DEVELOPING OSCILLATIONS FOR FREQUENCY MODULATED ACCORDING TO MODULATION SIGNALS

Filed Jan. 15, 1954

INVENTORS
HAYE BOUWMAN
IVAN HECQ
JOHAN HOGENDIJK

BY [signature]

AGENT

United States Patent Office 2,814,020

Patented Nov. 19, 1957

2,814,020

ARRANGEMENT FOR DEVELOPING OSCILLATIONS FREQUENCY MODULATED ACCORDING TO MODULATION SIGNALS

Haye Bouwman, Hilversum, Netherlands, Ivan Hecq, Schaerbeek, Belgium, and Johan Hogendijk, Hilversum, Netherlands, assignors, by mesne assignments, to North American Philips Company, Inc., New York, N. Y., a corporation of Delaware Application January 15, 1954, Serial No. 404,252

Claims priority, application Netherlands January 19, 1953

2 Claims. (Cl. 332—27)

Figure 1:
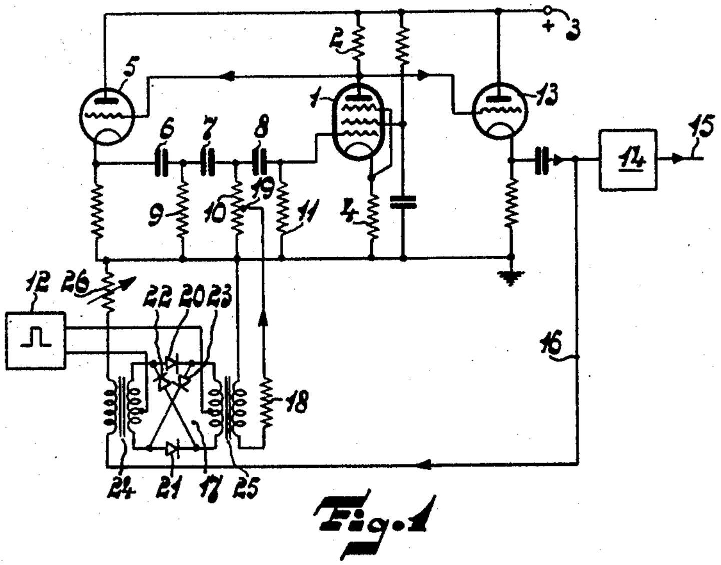

This invention relates to a device for developing oscillations frequency modulated according to a modulated signal and comprising a local-oscillator tube which is coupled back via a feedback circuit comprising a phase shifting network constituted by resistors and similar reactances (either capacitors or inductances).

The invention is of particular utility with systems for frequency shift telegraphy requiring high frequency stability, e. g. in carrier wave systems in which a number of adjacent telegraph channels are provided which in the case of frequency shifts of e. g. 70 cycles exhibit a frequency spacing of e. g. 120 to 150 cycles. In this case, even a frequency variation of, say, some few cycles of the oscillator circuits controlled by telegraph signals gives rise to an appreciable signal deformation and an appreciable increase of the cross talk level to adjacent telegraph channels.

The invention has for its object to provide an arrangement of the kind set forth in the preamble of this specification which is highly preferred in view of the foregoing.

According to the invention, for the purpose of frequency modulation of the local oscillations provision is made of means for adding to the feedback voltage in the first-mentioned feedback circuit an auxiliary feedback voltage which is about 90° out of phase therewith and the amplitude of which varies according to the modulating signal.

The measure according to the invention ensures that frequency stability is substantially determined by the first-mentioned feed-back circuit which is constituted by elements of fixed value. This permits the realization of a frequency stability of about $10^{-5}$.

According to a further feature of the invention the said means for frequency-modulation of the local oscillations comprise an auxiliary feed-back circuit and an amplitude modulator controlled by the modulation signal, the output impedance of the said auxiliary feed-back circuit forming part of the first-mentioned feed-back circuit.

In a highly preferred embodiment of the invention the phase shifting network in the first-mentioned feed-back circuit comprises a Wien bridge comprising the series-combination of a capacitor, a resistor and a capacitor-shunted resistor, the latter having taken from it the feed-back voltage for the local oscillator circuit. In this case the input terminals of the auxiliary feed-back circuit are connected to the junction point of the series resistor and series capacitor of the Wien-bridge and a tapping point on a potential divider connected in parallel with the said Wien bridge, whereas the output of the auxiliary feed-back is connected to the output of the first-mentioned feed-back circuit.

A particular advantage of this embodiment consists in that in the case of frequency modulation the amplitude of the oscillations developed remains constant.

Figure 2:
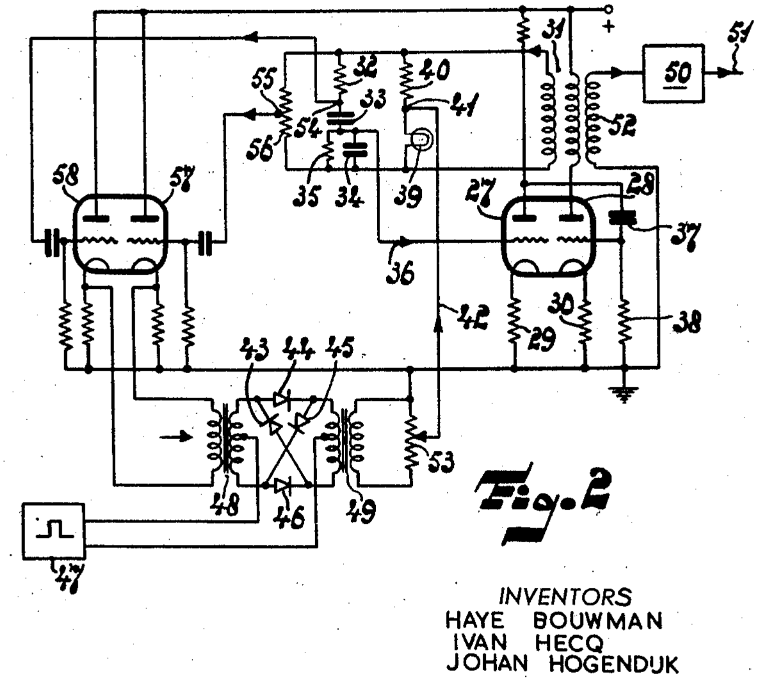

In order that the invention may be readily carried into effect, it will now be described with reference to the accompanying drawing, in which:

Fig. 1 is a schematic diagram of an embodiment of an arrangement according to the invention, comprising an oscillator coupled back via three RC-elements; and Fig. 2 is a schematic diagram of a preferred embodiment of the arrangement of the invention, comprising a Wien bridge oscillator.

The device shown in Fig. 1 for developing telegraph signals characterized by frequency shifts comprises an RC-oscillator, having a local oscillator tube constituted by a pentode 1, the anode of which is connected by way of an anode resistor 2 to the positive terminal 3 of the high tension apparatus, whereas the cathode is connected to ground by way of a resistor 4. The feed-back voltage of the RC-oscillator obtained from the anode resistor 2 is fed by way of a cathode amplifier 5 and a phase shifting network which comprises series capacitors 6, 7, 8 and parallel resistors 9, 10, 11, to the control grid of the pentode 1. The oscillator thus oscillates, at such a frequency that the anode and control grid alternating voltages differ in phase by exactly 180°.

In the circuit arrangement described the local oscillations are frequency modulated by the telegraph signals obtained from signal emitter 12, which is shown in block diagram form in Fig. 1. The telegraph signals characterized by frequency shifts, which are fed by way of a cathode amplifier 13 to a carrier wave apparatus 14 having an output lead 15, appear across the anode resistor 2 of the oscillator tube 1. The carrier wave apparatus 14 may be arranged for the use of 24 telegraph channels included in the frequency band from 420 to 3180 cycles, a frequency band of 120 cycles being reserved for each telegraph channel.

In accordance with the invention, for the purpose of frequency modulation of the local oscillations, means are provided for adding to the feed-back voltage an auxiliary feed-back voltage which is about 90° out of phase therewith and the amplitude of which varies according to the modulating signal. The auxiliary feedback means comprise an auxiliary feed-back circuit 16 connected to the output circuit of the cathode amplifier 13 and an amplitude modulator 17, which is controlled by the signal emitter 12. The output voltage of the amplitude modulator 17 is fed by way of a series resistor 18 to a tapping point 19 on the parallel resistor 10 of the phase shifting network.

Assembling of the quadrature output voltages of the two feed-back circuits provides the total feed-back voltage of the local oscillator circuit; said total feedback voltage being out of phase with the output voltage of the phase shifting network 6—11. The value of this phase shift varies with the amplitude of the auxiliary feedback voltage which is varied in the rhythm of the signal sign, resulting in a corresponding frequency variation of the oscillation developed by the local oscillator circuit. In fact, the oscillator frequency always adjusts itself such that the anode and the control grid alternating voltages differ in phase exactly by 180°.

In the circuit described the amplitude modulator 17 is constituted by a ring modulator comprising four rectifier cells 20, 21, 22, 23 which are included between the ends of the secondary of an input transformer 24 and the primary of an output transformer 25. The center-taps of the said transformer windings have supplied to them the output voltage of a signal emitter 12, which, according as a signal sign or a signal interval appears, provides a direct voltage of positive or of negative polarity of such amplitude that the rectifier pairs 20, 21 and 22, 23 are alternately released and cut off by the modulating signal signs. The polarity of the auxiliary feedback voltage thus varies in the rhythm of the signal sign with the result that the local oscillator frequency varies between two values which are located on either side of the nominal frequency of the local oscillator circuit.

In the circuit described the value of the auxiliary feed-back voltage, and hence the value of the frequency shifts, may be adjusted at will by means of a variable resistor 26 connected in series with the primary of the input transformer of the ring modulator. The amplitude of the auxiliary feedback voltage is appreciably smaller than the output voltage of the phase shifting network 6—11, for example 1/10 the magnitude of said output voltage, so that the influence of the auxiliary feed-back voltage on the oscillator frequency is very small. Thus, the frequency stability is substantially determined by the feed-back circuit 5—11 which is constituted by elements of fixed value; in the circuit described it is about $10^{-5}$.

It has been found in practice that the frequency shifts produced are accompanied by a low amplitude modulation of the local oscillations, for example of the order of a small percentage. This additional amplitude modulation may be rejected, if desired, by the use of the limiting circuit.

The arrangement according to the invention is not limited to the use of an RC-oscillator as shown in Fig. 1, but instead use may be made of RC-oscillators of different type. Obviously, as an alternative, the phase shifting network in the feed-back circuit of the local oscillator circuit arrangement may be constituted by resistors and inductances.

Fig. 2 is a preferred embodiment of the arrangement of the present invention, the amplitude of the local oscillations remaining constant irrespective of the frequency shifts obtained.

The local oscillator circuit is constituted by a Wien bridge oscillator comprising two coupled triodes 27, 28 the cathodes of which are connected to ground by way of resistors 29, 30. The anode of the triode 28 is coupled by way of an output transformer 31 to a phase shifting network which comprises a Wien bridge constituted by the series combination of a resistor 32, capacitor 33 and a resistor 35 shunted by a capacitor 34 the network 34, 35 being used for deriving the feed-back voltage for the local oscillator circuit. The feed-back voltage taken from the Wien-bridge is fed via a lead 36 to the control grid of the triode 27, the output circuit of which is connected to the control grid of the triode 28 by way of a coupling capacitor 37 and a grid leak 38.

For stabilization of the mean amplitude of the oscillations developed by the local oscillator the Wien bridge 32—35 has connected in parallel therewith the series combination of a voltage-dependent resistor 39, for example an incandescent electric lamp, and a resistor 40 the junction point of which apart from the potential divider 53 to be mentioned below is connected to ground by way of a lead 42. In the circuit so far described the value of the feedback voltage is consequently given by the potential difference between the voltages across the resistor 39 and the network 34, 35 in the Wien bridge.

For developing telegraph signals characterized by frequency shifts the arrangement described comprises an auxiliary feed-back circuit and a ring modulator controlled by a signal emitter 47 and comprising rectifier cells 43, 44, 45, 46, an input transformer 48 and an output transformer 49. The secondary of the transformer 49 is connected via the lead 42 to the junction point 41 between the resistor 40 connected in parallel with the Wien-bridge and the resistor 39. There appears across the output transformer 49 of the ring modulator an auxiliary feed-back voltage which varies in the rhythm of the signal signs, which is about 90° out of phase with the feed-back voltage of the Wien bridge and which jointly with the feed-back voltage from the Wien-bridge is fed to the control grid of the triode 27 via lead 36. In a manner similar to that set forth with reference to Fig. 1, there are developed in the local oscillator circuit telegraph signals characterized by frequency shifts, which signals, for further manipulation in a carrier wave apparatus 50 comprising an output cable 51, are taken from a coil 52 coupled with the transformer 31. The frequency shifts may be adjusted at will by means of a potential divider 53 connected in parallel with the secondary of the output transformer of the ring modulator.

In the circuit described the input terminals of the auxiliary feed-back circuit are connected respectively to the junction point 54 between the series connected resistor 32 and capacitor 33 in the Wien bridge and a tapping point 55 on a potential divider 56 connected in parallel with the bridge circuit. The tapping point 55 is adjusted so that the voltage between the points 54, 55 is about 90° out of phase with the voltage applied to the network 34, 35 in the Wien bridge. The voltages taken from the tapping points 54, 55 are supplied, for further manipulation in the auxiliary feedback circuit, via cathode amplifiers 57, 58, to different ends of the primary of the input transformer 48 of the ring modulator.

In the embodiment of the auxiliary feed-back circuit shown in Fig. 2 the attenuation factor of the total feed-back loop of the oscillator, that is to say the ratio between the control grid voltage of the triode 27 and the voltage supplied to the Wien bridge 32—35 is found to be substantially independent of the frequency of the oscillations developed, resulting in the important advantage that the amplitude of the oscillations developed remains constant in the case of a frequency shift. If the resistors 32, 35 and the capacitors 33, 34 of the Wien bridge are similar the resistance of the potential divider 56 included between the tapping point 55 and the junction point with the resistor 32 in the Wien bridge should be about 1/3 of the total potential divider resistance. Thus, the attenuation factor in the feed-back loop is about 3.

It may be noted that the effect mentioned also results if the series resistor 32 and the series capacitor 33 are interchanged.

The results obtained by means of a circuit of the type described are illustrated in the table below in which variations in amplitude and frequency of the oscillations produced are indicated as a function of anode voltage variations, filament voltage variations and load variations, the oscillator frequency being 1930 cycles and the frequency shift 60 cycles.

| | Amplitude variations | Frequency variations |
|---|---|---|
| | *Percent* | |
| Anode voltage variation from 200 to 240 Volts | 2 | $1.10^{-5}$ |
| Filament voltage variation 5.7 to 6.9 Volts | 0 | $10.10^{-5}$ |
| Load variation, 300 to 200 Ohms | 1 | $2.10^{-5}$ |

Under the most unfavourable operating conditions the variations both in frequency and in amplitude of the oscillations developed consequently remain limited to exceptionally low values.

The feed-back circuit of the local oscillator circuit arrangement of Fig. 2 is not limited to the use of a Wien bridge but instead other networks may be used. A particularly simple form of such a network comprises, for example, the series combination of a capacitor C1 and a network formed by two parallel branches, one branch including a resistor R1 and the other branch including the series combination of a resistor R2 and a capacitor C2. In this case the feedback voltage for the local oscillator circuit is taken from the capacitor C2 and the input terminals of the auxiliary feedback circuit are connected respectively to the junction point of the capacitor C1 and the parallel branches R1, R2, C2 and to a tapping point on a potential divider connected in parallel with the network R1, R2, C1, C2. Again, the tapping point on the potential divider is adjusted so that the input voltage of the auxiliary feed-back circuit is 90° out of phase with the oscillator feedback voltage provided by the phase shifting network. If the resistors R1, R2 and the capacitors C1, C2 are similar, the partial resistance of the potential divider included between the tapping point and the junction point with the capacitor C1 is about ⅔ of the total potential divider resistance. It should be noted that interchange of the resistors and capacitors in the network R1, R2, C1, C2 is possible. Obviously, as an alternative use may be made of other networks constituted by more elements, for example a shunted T-filter.

In the foregoing the invention is set forth by reference to two embodiments thereof for developing telegraph signals characterized by frequency shifts. Obviously, the arrangement described may be used with advantage for frequency modulation by other signals, for example intelligence signals.

What is claimed is:

1. An arrangement for producing a frequency modulated wave, comprising an electron discharge device having input and output electrodes, an oscillation feedback circuit interconnecting said input and output electrodes and comprising a phase shifting network, said phase shifting network comprising a Wien bridge comprising the series combination of a resistor, a capacitor and a capacitor-shunted resistor, said capacitor-shunted resistor having taken from it the feedback voltage for said discharge device, a potential divider connected in parallel with said bridge and having a tapping point thereon, an auxiliary feedback circuit coupled between said input and output electrodes comprising means coupled to said discharge device for deriving therefrom a first signal voltage, input means for a modulating signal, a ring type amplitude modulator having an input and an output, means for applying said first signal voltage and said modulating signal to said ring modulator thereby to amplitude modulate said first signal voltage, said last-mentioned means including means for coupling the input of said ring modulator to the junction point of said resistor and said capacitor of said Wien bridge and to said tapping point of said potential divider, and means for coupling the output of said ring modulator to the output of said oscillation feedback circuit at a point thereof wherein the oscillation feedback signal and said modulated signal are substantially in phase quadrature.

2. An arrangement for producing a frequency modulated wave, comprising an electron discharge device having input and output electrodes, an oscillation feedback circuit interconnecting said input and output electrodes and comprising a phase shifting network, said phase shifting network comprising a Wien bridge comprising the series combination of a resistor, a capacitor and a capacitor-shunted resistor, said resistors being similar and said capacitors being similar, said capacitor-shunted resistor having taken from it the feedback voltage for said discharge device, a potential divider connected in parallel with said bridge and having a tapping point thereon, said tapping point being positioned to provide a two-thirds potential divider ratio, an auxiliary feedback circuit coupled between said input and output electrodes comprising means coupled to said discharge device for deriving therefrom a first signal voltage, input means for a modulating signal, a ring type amplitude modulator having an input and an output, means for applying said first signal voltage and said modulating signal to said ring modulator thereby to amplitude modulate said first signal voltage, said last-mentioned means including means for coupling the input of said ring modulator to the junction point of said resistor and said capacitor of said Wien bridge and to said tapping point of said potential divider, and means for coupling the output of said ring modulator to the output of said oscillation feedback circuit at a point thereof wherein the oscillation feedback signal and said modulated signal are substantially in phase quadrature.

References Cited in the file of this patent

UNITED STATES PATENTS

| | | |
|---|---|---|
| 2,268,872 | Hewlett | Jan. 6, 1942 |
| 2,321,269 | Artzt | June 8, 1943 |
| 2,496,148 | Butts | Jan. 31, 1950 |

OTHER REFERENCES

Proceedings of the IRE, January 1943, pp. 22–24.